(12) United States Patent
Kenthapadi

(10) Patent No.: US 10,430,831 B2
(45) Date of Patent: Oct. 1, 2019

(54) PRIORITIZING COMPANIES FOR PEOPLE SEARCH

(71) Applicant: Microsoft Technology Licensing, LLC, Redmond, WA (US)

(72) Inventor: Krishnaram Kenthapadi, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 638 days.

(21) Appl. No.: 15/247,311

(22) Filed: Aug. 25, 2016

(65) Prior Publication Data
US 2018/0060908 A1    Mar. 1, 2018

(51) Int. Cl.
*G06Q 30/02* (2012.01)
*G06Q 50/00* (2012.01)
*G06F 16/9535* (2019.01)
*G06F 16/2457* (2019.01)

(52) U.S. Cl.
CPC ... *G06Q 30/0255* (2013.01); *G06F 16/24578* (2019.01); *G06F 16/9535* (2019.01); *G06Q 50/01* (2013.01)

(58) Field of Classification Search
CPC ............................... G06Q 30/02; G06F 17/30
See application file for complete search history.

(56) References Cited

U.S. PATENT DOCUMENTS 8,832,132 B1* 9/2014 Spertus ................. H04L 67/306
                                                                  707/765
2011/0320441 A1* 12/2011 Lee ..................... G06F 16/9535
                                                                  707/723

* cited by examiner

*Primary Examiner* — Marilyn G Macasiano
(74) *Attorney, Agent, or Firm* — Schwegman Lundberg & Woessner, P.A.

(57) ABSTRACT

A search engine optimization system is provided with an on-line social network system. The on-line social network system includes or is in communication with a search engine optimization (SEO) system that is configured to prioritize company keywords (potential search terms) that represent respective people search results pages (PSERPs). The value of a company keyword is expressed as a priority score assigned to that company keyword. The SEO system generates priority scores for different company keywords, using a probabilistic model that takes into account a value expressing how likely the company keyword is to be included in a search query as a search term and/or a value expressing how likely is a search that includes the company keyword as a search term is to produce relevant results, as well as other signals that are indicative of the relative importance of a company represented by the company keyword.

20 Claims, 5 Drawing Sheets

PRIORITIZING COMPANIES FOR PEOPLE SEARCH

TECHNICAL FIELD

This application relates to the technical fields of software and/or hardware technology and, in one example embodiment, to system and method to prioritize company keywords for use in the context of an on-line social network system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
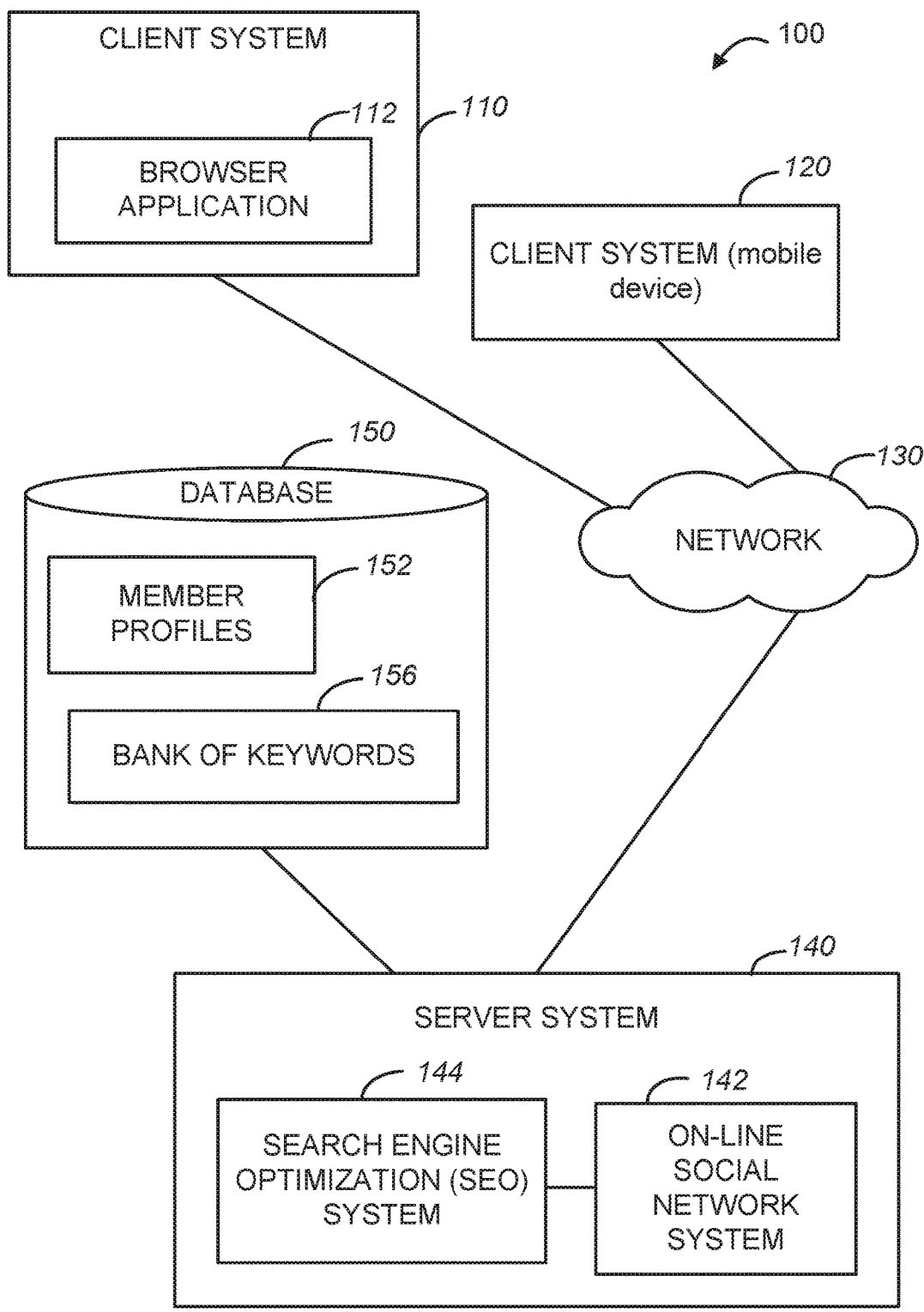
FIG. 1 is a diagrammatic representation of a network environment within which an example method and system to prioritize search terms representing respective companies in an on-line social network system may be implemented.

A method and system to prioritize search terms representing respective companies in an on-line social network system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an on-line social networking application" and "an on-line social network system" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network.

The profile information of a social network member may include various information such as, e.g., the name of a member, current and previous geographic location of a member, current and previous employment information of a member, information related to education of a member, information about professional accomplishments of a member, publications, patents, etc. The profile information of a social network member may also include information about the member's professional skills. A particular type of information that may be present in a profile, such as, e.g., company, industry, job position, etc., is referred to as a profile attribute. A profile attribute for a particular member profile may have one or more values. For example, a profile attribute may represent a company and be termed the company attribute. The company attribute in a particular profile may have values representing respective identifications of companies, at which the associated member has been employed. For the purposes of this description, the term "company" is used as a generic term for designating a place of employment. Other examples of profile attributes are the industry attribute and the region attribute. Respective values of the industry attribute and the region attribute in a member profile may indicate that the associated member is employed in the banking industry in San Francisco Bay Area.

Members may access other members' profiles by entering the name of a member represented by a member profile in the on-line social network system into the search box and examining the returned search results or by entering into a search box a phrase intended to represent a member's skill, geographic location, place of employment, etc. For example, a user may designate a search as a people search (e.g., by accessing a web page designated for people search or including a predetermined phrase, such as "working in" or "employed as," into the search box) and enter one or more keywords, e.g., "software engineer" and "San Francisco." A web page containing search results produced by the on-line social network system in response to a people search is referred to as a People SERP (people search results page, hereafter denoted PSERP).

Figure 4:
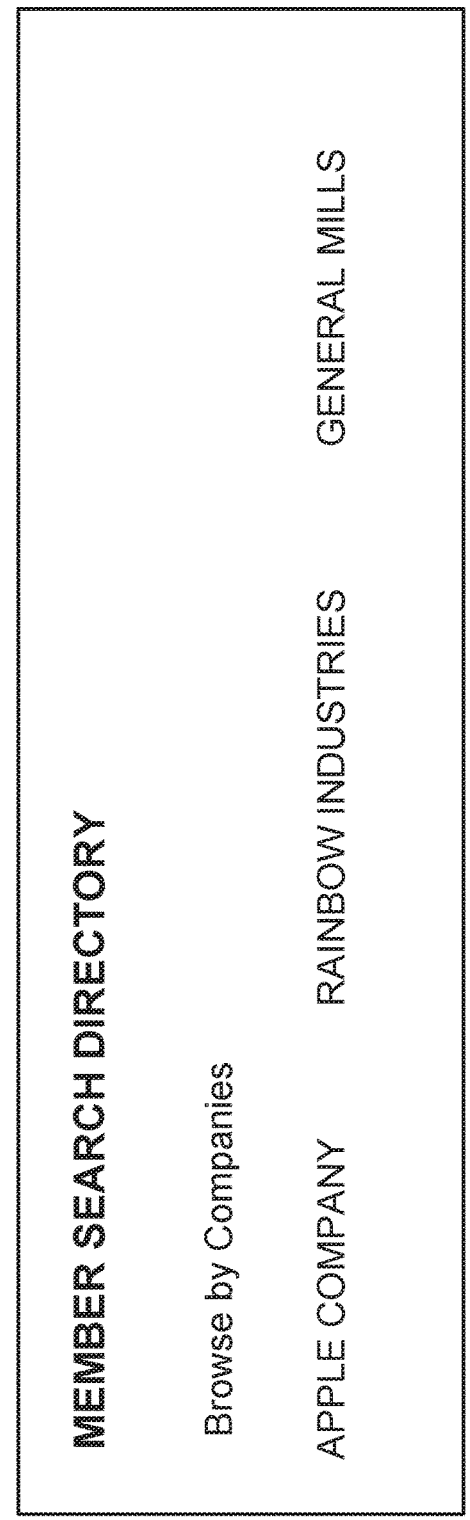
FIG. 4 is an example representation of a user interface for navigating a people directory by location.

Another way to access members' profiles is via a people directory web page provided by the on-line social network system. A people directory web page (also referred to as a people directory) may be organized, e.g., alphabetically by keywords. The keywords may represent members' professional skills, members' geographic locations, members' places of employment (referred to by a generic term "companies"), etc. An example representation of a user interface 400 for navigating a people directory is shown in FIG. 4. In FIG. 4, the user interface 400 permits exploring member profiles based on members' respective places of employment—companies. A user may, for example select a link identified as "Apple Company" and be presented with a PSERP referencing member profiles representing members who are or were at some point employed at Apple Company.

While it is possible to search for people using the web pages provided by the on-line social network system, third party search engines are often used as entry points for guests to learn about the on-line social network system. It is beneficial to provide a rich people search experience for guests (users that are not members of the on-line social network system) so that they understand the value of the on-line social network system ecosystem and become members, thereby potentially driving growth and eventual monetization. Since guests often use web search as the starting point in searching in general and for people having specific professional characteristics specifically, it may be desirable that the people search results pages (PSERPs) provided by the on-line social network system are ranked such that they appear at the top of the search results list displayed to the originator of the people search request.

In the on-line social network system each PSERP is associated with one or more keywords that represent members' professional skills, members' geographic locations, members' places of employment (companies), etc. For example, a PSERP that includes links to member profiles that indicate that the respective members are software engineers at ACME company may be associated in the on-line social network system with the keywords "software engineer" and "ACME." For the purposes of this description, it may be said that a PSERP may be represented by such keywords. A keyword (which may comprise more than one word) that represents an organization that can be a place of employment is referred to as a company keyword. A keyword (which may comprise more than one word) that represents a characteristic of a member of the on-line social network system, e.g., professional skill, geographic location, industry, job title, etc.) is referred to as a company keyword.

Given a great number of companies that may appear in member profiles, it is beneficial to understand the value of PSERPs relative to one another—in other words, to determine the relative prioritization of a PSERPs listing members working at a certain company against PSERPs listing members working at other companies. A related problem is to determine the relative prioritization of different <company, location> pairs. For example, PSERPs (people search results pages) including the pair <Capital One, Richmond in VA> (referencing profiles of members who are employed at Capital One in Richmond, Va.) may be of greater interest to users, as compared to PSERPs including the pair <Capital One, Bangalore in India> (referencing profiles of members who are who are employed at Capital One in Bangalore).

In one example embodiment, the on-line social network system includes or is in communication with a search engine optimization (SEO) system that is configured to combine signals from orthogonal data sources to calculate respective priority scores of company keywords and use these priority scores for enhancing the users' on-line people search experience. A set of keywords to be scored may be selected automatically, e.g., based on the information stored in the member profiles, and stored in a database as a bank of keywords.

In one embodiment, the SEO system may be configured to generate priority scores for different company keywords, using a probabilistic model that takes into account both importance and relevance of a company keyword. The relevance score of a company keyword (or any keyword that can be used in a search query directed to a people search) is a value expressing how likely a search that includes the keyword as a search term is to produce relevant results. For the purposes of this description, a relevant result is a query result that originated from the on-line social network system. The importance score for a company keyword is generated by combining signals from data sources corresponding to the following dimensions: popularity, strength, and financial value. The popularity score of a company keyword is a value expressing how likely a company keyword is to be issued in a search query by examining the search volume with respect to the searches within the on-line social network system, as well as by examining the search volume with respect to the searches within one or more third party search engines, as described in further detail later in the specification. The SEO system also uses information indicating how many members follow the company page in the on-line social network system, such as the current number of members of the on-line social networking system that are followers of the company corresponding to the company keyword, the total number of followers that the company has had within a certain time period (e.g., within the last year or within the last 18 months), and the difference (growth or decline) in the number of followers of the company within a certain time period. The number of followers of a company in an on-line social network system is the number of member profiles in the on-line social network system that include a link indicating a follower relationship between that member profile and the company profile representing the company in the on-line social network system.

The strength signals used to generate the importance score for a company keyword include one or more of: the number of current employees at the company, the number of members of the on-line social network system who have ever worked at the company, the number of members of the on-line social network system who have worked at the company within a certain time period (e.g., within the last year or within the last 18 months), and the difference (growth or decline) in the number of employees at the company within a certain time period (e.g., within the last year or within the last 18 months). The financial value signals used by the SEO system to generate the importance score for a company keyword include one or more of indicators obtained for the company represented by the company keyword: the market capitalization/valuation per employee, the total market capitalization/valuation, the current (or average within a certain recent period of time) revenue per employee, the total revenue, etc. Information representing the strength signals and financial value signals may be obtained from a variety of sources, e.g., public and private databases, as well as data stored by the on-line social network system.

The SEO system may also be configured to generate the importance score for a (location, company) pair. The importance score for a (location, company) pair may be generated by combining signals from data sources corresponding to the following dimensions: popularity, strength, financial value signals, as well as external sources. The SEO system may be configured to generate popularity value for a (location, company) pair utilizing information regarding how likely the company represented by the company keyword is to be issued in a search query by examining the search volume with respect to the searches within the on-line social network system, as well as by examining the search volume with respect to the searches within one or more third party search engines, as described in further detail later in the specification. When determining the popularity value for a (location, company) pair the SEO system also uses information indicating how many members follow the company page in the on-line social network system, such as the current number of members of the on-line social networking system that are followers of the company corresponding to the company keyword at the location specified in the (location, company) pair, the total number of followers that company at that location has had within a certain time period (e.g., within the last year or within the last 18 months), and the difference (growth or decline) in the number of followers of that company at that location within a certain time period.

The strengths signals used by the SEO system to generate the importance score for a (location, company) pair include one or more of: the number of current employees at the company at that location, the number of members of the on-line social network system who have ever worked at the company at that location, the number of members of the on-line social network system who have worked at the company at that location within a certain time period (e.g., within the last year or within the last 18 months), and the difference (growth or decline) in the number of employees at the company at that location within a certain time period (e.g., within the last year or within the last 18 months).

The financial value signals used by the SEO system to generate the importance score for a (location, company) pair include one or more of indicators obtained for the company represented by the company keyword at le location indicated by the (location, company) pair: the market capitalization/valuation per employee for the company at that location, the total market capitalization/valuation for the company at that location, the current (or average within a certain recent period of time) revenue per employee for the company at that location, the total revenue for the company at that location, etc. The external sources used to generate the importance score for a (location, company) pair include, e.g., population size for the location, as well as the change (growth or decline) in the population size at the location within a certain time period (e.g., within the last year or within the last 18 months). Information representing the strength signals and financial value signals may be obtained from a variety of sources, e.g., public and private databases, as well as data stored by the on-line social network system.

In some embodiments, the priority score for a company keyword may be generated by multiplying the importance score for the company keyword by the relevance score for that same company keyword, e.g. using Equation 1 shown below.

$$\text{PriorityScore}(w) = Pr(\text{RELEVANT} \& w) = Pr(w) * Pr(\text{RELEVANT}/w), \quad \text{Equation (1):}$$

where w is a company keyword, Pr(w) is probability expressing the importance score for the company keyword w, and Pr(RELEVANT/w) is probability expressing the relevance score for the company keyword w.

The company keywords that have higher priority scores are considered to be more valuable, and, as such, can be included into the people directory under each alphabet and/or can be used to determine which PSERP pages to be included into a sitemap submitted to one or more third party search engines (such as, e.g., Google® or Bing®).

Priority scores generated for company keywords may be used to determine relative importance of terms within a query, especially where other search terms are also associated with their respective priority scores.

For a (location, keyword) pair, (l,w), where l is a location keyword and w is a company keyword, the priority score for such pair may be generated by multiplying its relevance score by its importance score, e.g. using Equation 2 shown below.

$$\text{PriorityScore}(l,w) = Pr(\text{RELEVANT} \& l, w) = Pr(l,w) * Pr(\text{RELEVANT}/l,w), \quad \text{Equation (2):}$$

where (l,w) is a (location, keyword) pair, Pr(l,w) is a value expressing importance of a (location, keyword) pair, and Pr(RELEVANT/l,w) is probability expressing the relevance score for the (location, keyword) pair.

When priority scores are generated for (location, keyword) pairs, their respective priority scores are used to determine, which (location, keyword) pairs to highlight in the people directory, which PSERP landing pages corresponding to the (location, keyword) pairs to include in the people directory, as well as to determine which PSERP landing pages to be included into a sitemap submitted to one or more third party search engines.

Returning to the discussion of a process for generating an importance score for a company keyword, in order to generate the importance score Pr(w) for a particular keyword w (a subject company keyword), the SEO system generates respective intermittent importance scores $P_j(w)$, where j is the j-th data source from k data sources. As explained above, example data sources for generating the importance score for a company keyword are popularity signals, strength signals, and financial value signals. For example, $P_j(w)$ calculated using the popularity signal obtained from Google® data source may be determined based on the percentage of people searches that include the company keyword w. The intermittent popularity value $P_j(w)$ that corresponds to a third-party search volume may be designated as G(w). The intermittent popularity value $P_j(w)$ that corresponds to people search volume obtained by monitoring search requests in the on-line social network system may be designated as I(w).

When the on-line social network system is used as a data source for determining popularity of a company keyword, the SEO system considers every search request to be a people search. When a third party search engine is used as a data source for determining popularity of a company keyword, the SEO system may first determine whether the intent of the search is related to people search and take into account only those searches that have been identified as company, while ignoring those searches that have not been identified as company. Identifying a people search directed to a third party search engine as being company could be accomplished by detecting the presence, in a search request, of additional terms that have been identified as intent indicators, such as, e.g., the word "people" or "member," as well as phrases such as "work as/at/in" or "who are."

Because the importance scores generated based on data obtained from different sources may be in different scales, the SEO system may be configured to first normalize the intermittent importance scores $P_j(w)$ for a given company keyword w, and then aggregate the normalized importance scores to arrive at the importance score Pr(w). This approach may be expressed by Equation (3) shown below.

$$Pr(w)=\text{importanceAggregateFunction}(\text{normFunction}_1(P_1(w)),\text{normFunction}_2(P_2(w)), \ldots ,\text{normFunction}_k(P_k(w)))$$ Equation (3)

In one embodiment, a different normalization function is used for each of the intermittent importance score (normFunction1 for $P_1(w)$, normFunction2 for $P_2(w)$, etc.). The aggregation function, denoted as importanceAggregateFunction in Equation (3) above, can be chosen to be one of max, median, mean, mean of the set of normalized importance scores selected from a certain percentile range, e.g., from 20th to 80th percentile. In some embodiments, the aggregation function can be the output of a machine learning model (such as logistic regression) that is learned over ground truth data. The normalization function normFunction$_j(P_j(w))$ is to map each of the intermittent importance score $P_j(w)$ to the same interval.

For example, the normalization function scale($P_j(w)$) may map each of the intermittent importance score $P_j(w)$ to the interval [0, 1] and utilize three percentile values—the lower threshold ($\alpha$-percentile value), the median (50-percentile value), and the upper threshold ($\beta$-percentile value). The normalization function performs piecewise linear mapping from the intermittent importance scores to [0, 1]. An intermittent importance score is mapped to 0 if it is less than the lower threshold. Linear scaling to [0, 0.5] is performed for intermittent importance scores that are greater than or equal to the lower threshold and less than or equal to the median. Linear scaling to [0.5, 1] is performed for intermittent importance scores that are greater than or equal to the median and less than or equal to the upper threshold. An intermittent importance score is mapped to 1 if it is greater than the upper threshold. The max value from the set of normalized importance scores may then be used as the aggregation function: max(scale($P_1(w)$), scale($P_2(w)$), . . . , scale($P_k(w)$)). For example, when the intermittent importance scores are G(w) and I(w), the aggregation function is: max(scale(G(w)), scale(I(w))). The scaling applied to each of the intermittent importance scores may be different since the percentile values could be different for each intermittent importance type.

In some embodiments, the SEO system may be configured to use the importance score of a company keyword as the priority score for that keyword. Yet in other embodiments, as stated above, respective importance scores generated for the company keywords may be used to derive the respective corresponding priority scores, e.g., by multiplying the value expressing the importance score by the value expressing the relevance score, as shown in Equation (1).

Where the respective importance scores are being generated for (location, company) pairs, (l,w), where l is a location keyword and w is a company keyword, the SEO system may be configured to first normalize the intermittent importance scores $P_j(l,w)$ for a given location keyword l and a company keyword w, and then aggregate the normalized importance scores to arrive at the importance score Pr(l,w), using the approach described above with respect to normalizing the intermittent importance scores $P_j(w)$ for a given company keyword w and then aggregating the normalized importance scores.

As mentioned above, a value expressing how likely a search that includes the company keyword w as a search term is to produce relevant results may be referred to as a relevance score. In one embodiment, the SEO system may be configured to determine the relevance score Pr(RELEVANT/w) for a company keyword l using one or multiple indicators of relevance.

One example of an indicator of relevance of a company keyword is the number of people search results returned in response to a query that includes a company keyword as a search term and that originates from the on-line social network system. Another indicator of relevance of a keyword may be related to respective quality scores assigned to the returned results by a third party search engine. For example, a third party search engine returns search results in response to a query that includes a company keyword as a search term. The returned results each have a quality score assigned to it by the search engine. The sum of quality scores of those returned search results that originate from the on-line social network system may be used by the SEO system as one of the indicators of relevance of that keyword. Yet another indicator of relevance of a keyword may be obtained based on monitoring user engagement signals with respect to the search results returned in response to a query that includes a company keyword as a search term and that originate from the on-line social network system. For example, with respect to the search results returned in response to a query that includes a company keyword as a search term and that originate from the on-line social network system, the SEO system may monitor and record signals such as click through rate (CTR) and bounce rate. These signals can be aggregated over individual people results (PSERPs) to obtain a combined user engagement score for that PSERP. This user engagement score may be then utilized in deriving the relevance score for the company keyword.

Another indicator of relevance of a company keyword may be obtained by examining member profiles in the on-line social network system. For example, the SEO system may determine how frequently a company keyword in used in a member profile to designate past or present geographic location or a place of work. The intuition is that if there is a large number of professionals at a certain geographic location, people are more likely to use such company keywords as search terms, and are more likely to find relevant people results for such company keywords.

Different indicators of relevance with respect to a particular company keyword w are used to generate respective intermittent relevance values $P_j(\text{RELEVANT}/w)$, where j is the j-th data source from k data sources. Because the relevance values generated based on data obtained from different may be in different scales, the SEO system may be configured to first normalize the intermittent relevance values $P_j(\text{RELEVANT}/w)$ for a given company keyword w, and then aggregate the normalized relevance values to arrive at the relevance score Pr(RELEVANT/w). This approach may be expressed by Equation (4) shown below.

$$Pr(\text{RELEVANT}/w) = \text{relevanceAggregateFunction}$$
$$(\text{normFunction}_1(P_1(\text{RELEVANT}/w)), \text{normFunction}_2(P_2(\text{RELEVANT}/w)), \ldots, \text{normFunction}_l(P_l(\text{RELEVANT}/w)))$$

Equation (4)

A different normalization function may be used for each of the intermittent relevance value (normFunction1 for $P_1$(RELEVANT/w), normFunction2 for $P_2$(RELEVANT/w), etc.). Furthermore, in some embodiments, these normalization functions are also different from those used for relevance score computation. The aggregation function, denoted as relevanceAggregateFunction in Equation (4) above, can be chosen to be one of max, median, mean, mean of the set of normalized relevance values selected from a certain percentile range, e.g., from 20th to 80th percentile. In some embodiments, the aggregation function can be the output of a machine learning model (such as logistic regression) that is learned over ground truth data. In some embodiments, the normalization function normFunction$_j$($P_j$(RELEVANT/w)) is to map each of the intermittent relevance value $P_j$(RELEVANT/w) to the same interval and utilize two threshold values—the lower threshold ($\varepsilon 1$), and the upper threshold ($\varepsilon 2$).

For example, with respect to the intermittent $P_j$(RELEVANT/w) is the number of search results returned in response to a query that includes a company keyword as a search term that originate from the on-line social network system, the normalization function scale($P_j$(RELEVANT/w)) maps the people result count to [0, 1] using a step function: 0 if the people result count is fewer than the lower threshold, 1 if the people result count is greater than the upper threshold. If the people result count is greater than the lower threshold and less than the upper threshold, its normalized value is calculated as shown in Equation (5) below.

$$\text{scale}(P_j(\text{RELEVANT}/w)) = (P_j(\text{RELEVANT}/w)) - \varepsilon 1)/(\varepsilon 2 - \varepsilon 1)$$

Equation (5)

In another example, where the intermittent $P_j$(RELEVANT/w) is the sum of quality scores of those returned search results that originate from the on-line social network system, a combined quality score for the page and the company keyword w is derived using an aggregation function such as max, median, mean, mean of the values between certain percentiles (e.g., from 20th to 80th percentile), etc. The aggregation function can also take into account position discounting, that is, provide greater weight to people search results at top positions.

Another example of the intermittent $P_j$(RELEVANT/w) is the user feedback/engagement signals, such as, e.g., overall click through rate, bounce rate, etc. These signals can also be aggregated over individual people results to obtain combined score for the associated PSERP. Yet another example of the intermittent $P_j$(RELEVANT/w) is the value derived from examining the member profiles and determining the frequency of appearance of the company keyword w in those profiles.

Where the respective relevance scores are being generated for (location, keyword) pairs, (l,w), where l is a location keyword and w is a company keyword, the SEO system may be configured to first normalize the intermittent relevance scores $P_j$(RELEVANT/(l,w)) for a given location keyword l and a company keyword w, and then aggregate the normalized relevance scores to arrive at the relevance score Pr(l,w), using the approach described above with respect to normalizing the intermittent relevance scores $P_j$(RELEVANT/l) for a given company keyword l and then aggregating the normalized relevance scores.

As explained above, in some embodiments, respective relevance scores generated for company keywords may be used to derive respective priority scores, e.g., by multiplying the value expressing the relevance score for a keyword by the value expressing the importance score for that same keyword.

An example keyword prioritization system may be implemented in the context of a network environment 100 illustrated in FIG. 1. As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a search engine optimization (SEO) system 144. As explained above, the SEO system 144 may be configured to prioritize keywords representing respective companies and pairs of keywords where one keyword from the pair represents a geographic location and the other keyword from the pair is a company keyword, using the methodologies described above. An example keyword prioritization system, which corresponds to the SEO system 144 is illustrated in FIG. 2.

Figure 2:
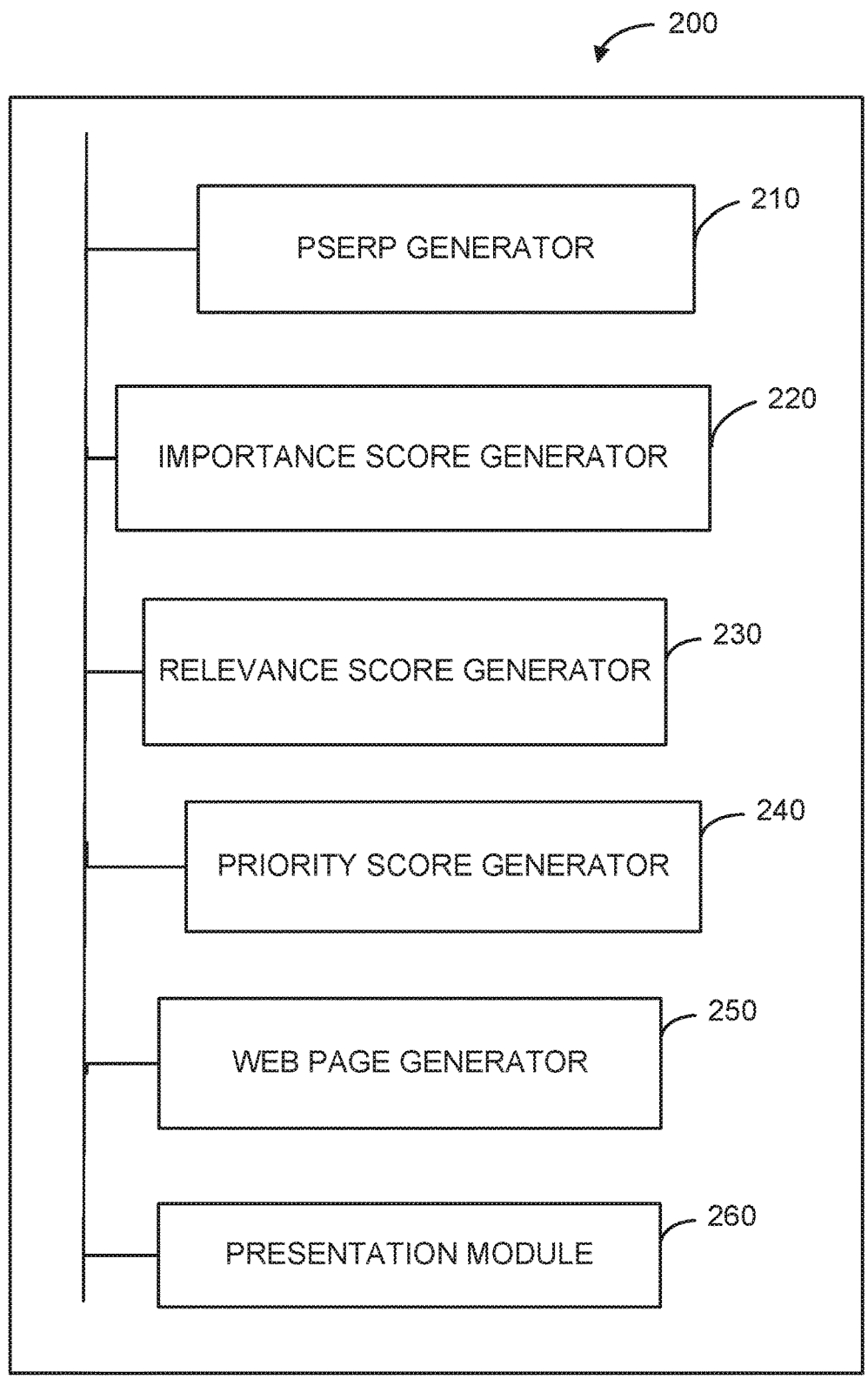
FIG. 2 is block diagram of a system to prioritize search terms representing respective companies in an on-line social network system, in accordance with one example embodiment.

FIG. 2 is a block diagram of a system 200 to prioritize search terms representing respective companies in an on-line social network system 142 of FIG. 1. As shown in FIG. 2, the system 200 includes a PSERP generator 210, an importance score generator 220, a relevance score generator 230, and a priority score generator 240.

The PSERP generator 210 is configured to generate a PSERP, which is a web page that comprises references to one or more member profiles representing respective members in the on-line social network system, and selects one or more terms as representing the PSERP. A term representing the PSERP may represent a professional skill of a member (e.g., "project manager"), a geographic location of a member, an organization that is a place of employment of the member (e. g., "ABC company"), etc. The PSERP generator 210 selects one or more terms to represent the PSERP by examining member profiles referenced in the PSERP. For example, if the member profiles referenced in a PSERP represent members that work at companies in "ABC company," the PSERP generator 210 may identify the keyword "ABC company" (referred to as a company keyword) as representing that PSERP. A company keyword is associated with a company identification representing a company profile maintained in the on-line social networking system 142 of FIG. 1.

The importance score generator 220 is configured to generate respective importance scores for keywords or pairs of keywords, using the methodologies described above. The importance score of a keyword indicates how likely the company keyword is to be included in a people-related search query as a search term. A people-related search is a search for people characterized by features or attributes specified by the search terms included in the search query. The importance score generator 220 may monitor people search requests that include a company keyword, and use the frequency of appearance of the company keyword in the monitored search requests, as well as a number of member profiles in the on-line social network system that follow the company profile, to determine the importance score for the company keyword. In one embodiment, the importance score generator 220 uses data collected from search requests directed to a search engine provided by the on-line social network system 142 and also search requests directed to a third party search engine. When data used by the importance score generator 220 to generate the importance score is obtained from different sources, the importance score generator 220 applies a normalization function to the intermittent importance scores and aggregates the resulting scaled values, as explained in detail above. The relevance score generator 230 is configured to generate respective relevance scores for company keywords or pairs of (location, company) keywords, using the methodologies described above.

The priority score generator 240 is configured to generate respective priority scores for company keywords or pairs of (location, company) keywords, using the methodologies described above. The priority score generator 240 uses the importance score generated for company keywords or pairs of (location, company) keywords to generate the priority score for that company keyword or that pair of keywords. In some embodiments, the priority score generator 240 uses, to generate the importance score for a keyword or a pair of keywords, a relevance score generated for that keyword or that pair of keywords in addition to the importance score. The relevance score expresses how likely a search request, directed to a third party search engine, that includes a keyword, is to produce a relevant result that originates from the on-line social network system. Relevant results may be, e.g., references to member profiles maintained by the on-line social network system 142.

Also shown in FIG. 2 are a web page generator 250 and a presentation module 260. The web page generator 250 may be configured to generate a web page and selectively include, in the web page, a reference to a PSERP represented by a company keyword, based on the priority score of that company keyword. The reference to the PSERP may be in the form of the company keyword or, e.g., in the form of one of the other keywords that represent that PSERP. The web page may be a web page representing the people directory provided by the on-line social network 142, an example of which is shown in FIG. 4. In FIG. 4, the link designated as "APPLE COMPANY" is an example of a reference to a PSERP represented by a company keyword "APPLE COMPANY." Some operations performed by the system 200 may be described with reference to FIG. 3.

Figure 3:
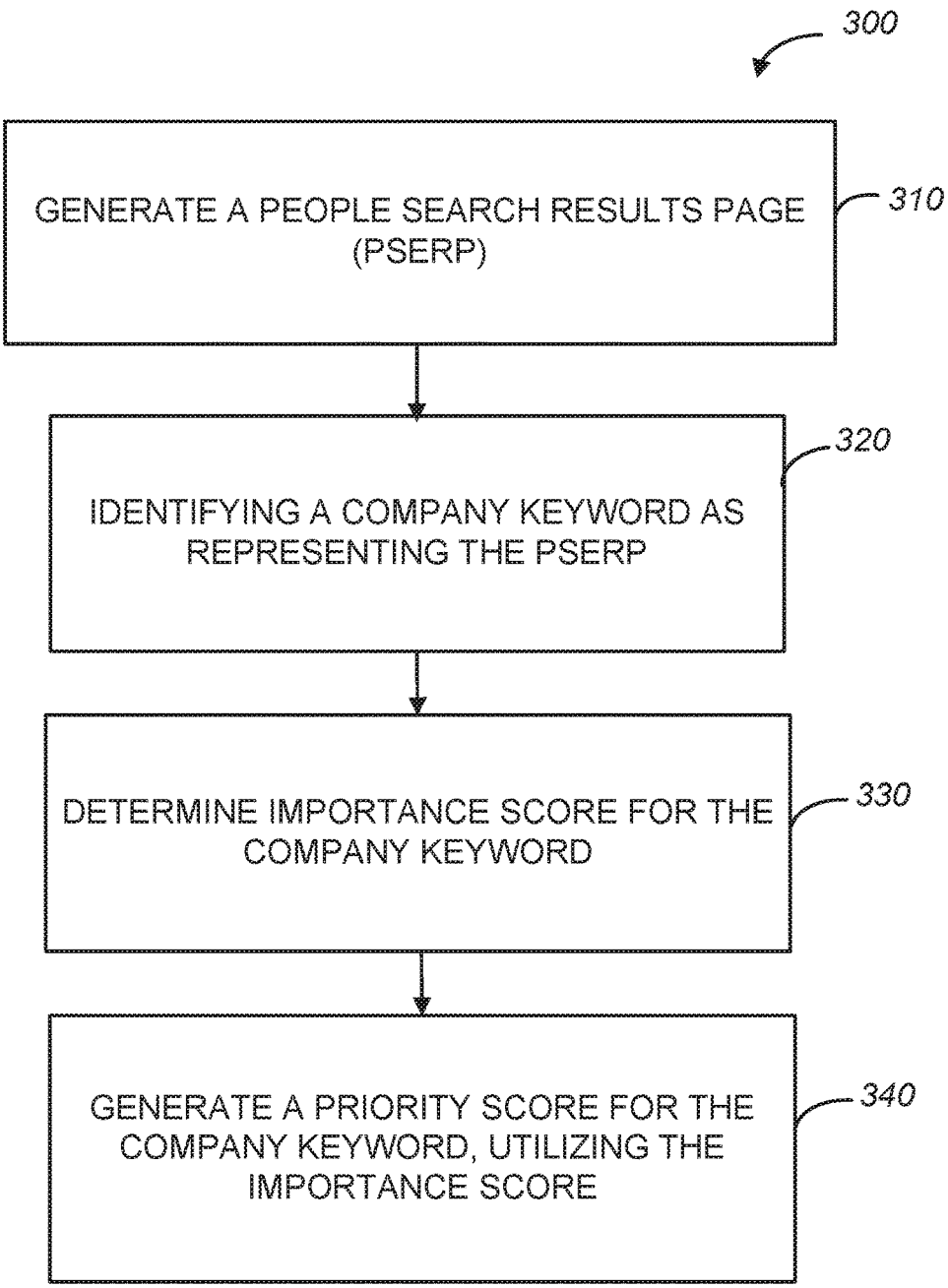
FIG. 3 is a flow chart illustrating a method to prioritize search terms representing respective companies in an on-line social network system, in accordance with an example embodiment.

FIG. 3 is a flow chart of a method 300 to prioritize search terms representing respective companies in an on-line social network system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the PSERP generator 210 of FIG. 2 generates a PSERP, which is a web page that comprises references to one or more member profiles representing respective members in the on-line social network system. At operation 320, the PSERP generator 210 identifies a company keyword as representing the PSERP. The importance score generator 220 of FIG. 2 generates the importance score for the company keyword at operation 330. The priority score generator 240 of FIG. 2 generates the priority score for the company keyword at operation 330.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of companies.

Figure 5:
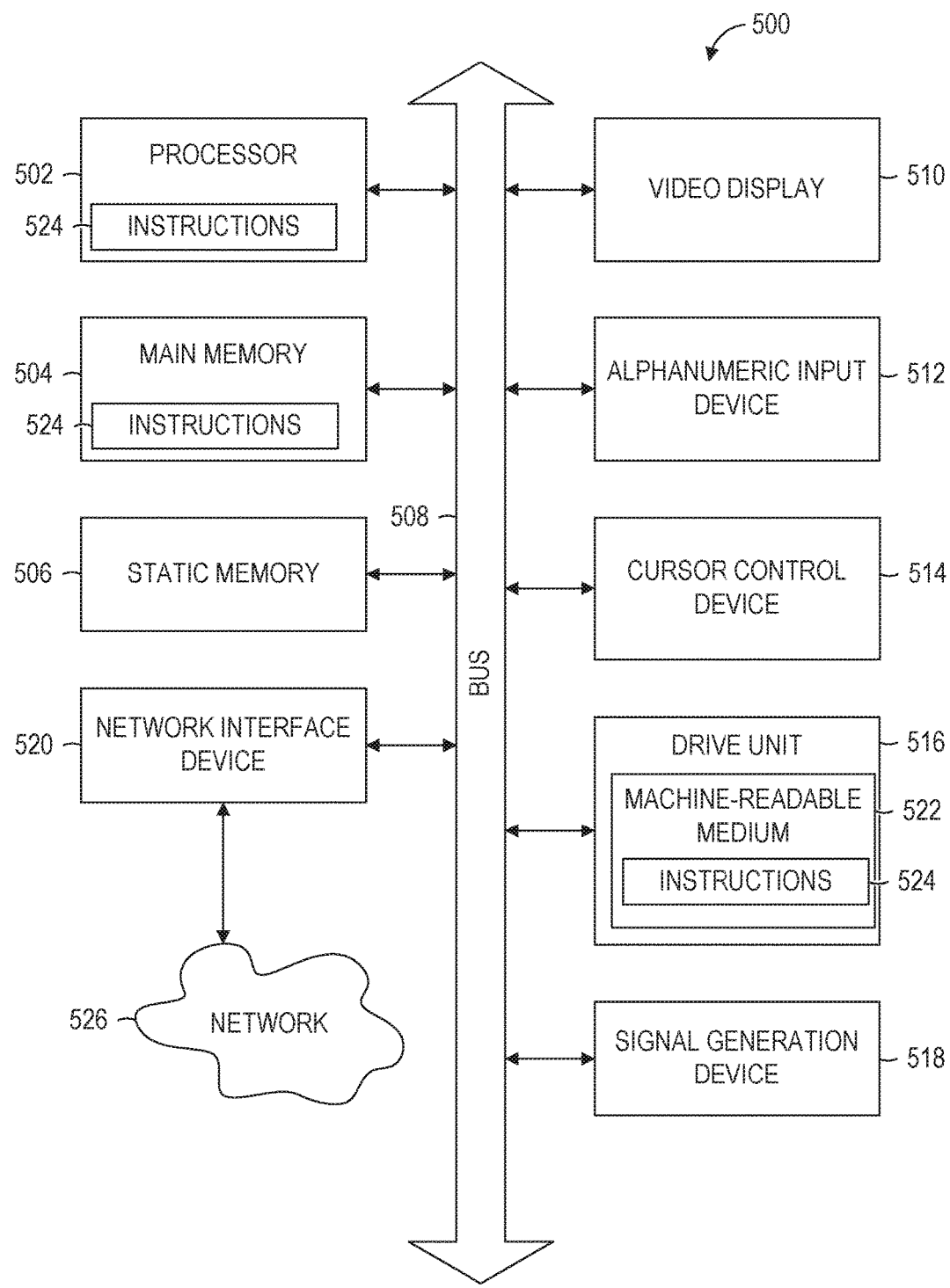
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of companies.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to prioritize company keywords in an on-line social network system has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   generating a people search results page (PSERP), the PRERP comprising references to one or more member profiles representing respective members in an on-line social network system;
   using at least one processor, identifying a company keyword as representing the PSERP, the company keyword associated with a company identification representing a company profile maintained in the on-line social networking system;
   determining importance score for the company keyword utilizing data reflecting how frequently people-related search requests include the company keyword and also reflecting a number of member profiles in the on-line social network system that follow the company profile;
   generating a priority score for the company keyword, utilizing the importance score; and
   generating a web page including a reference to the PSERP based on the priority score for the company keyword.

2. The method of claim 1, wherein the importance score is generated using a number of employees at an organization identified by the company identification.

3. The method of claim 1, wherein the importance score reflects a financial value associated with an organization identified by the company identification.

4. The method of claim 3, wherein the financial value represents market capitalization for the organization identified by the company identification.

5. The method of claim 3, wherein the financial value represents market capitalization per employee of the organization identified by the company identification.

6. The method of claim 1, wherein the web page is a people directory page provided by the on-line social network system, the method comprising causing presentation of the people directory page on a display device.

7. The method of claim 1, wherein the reference to the PSERP is the company keyword.

8. The method of claim 1, wherein the determining of the importance score for the company keyword comprises determining the importance score for a pair comprising the company keyword and a location keyword representing a geographic location.

9. The method of claim 1, wherein the generating of the priority score for the keyword comprises using, in addition to the importance score, a relevance score generated for the company keyword, the relevance score expressing how likely a search request that includes the company keyword is to produce a relevant result that originates from the on-line social network system, the search request directed to a third party search engine, the third party search engine and the on-line social network system provided by different entities.

10. The method of claim 1, wherein the generating of the importance score comprises utilizing one or more strength signals, the strength signals represent the number of member profiles in the on-line social network system that include an identification of an organization represented by the company keyword.

11. A computer-implemented system comprising:
    a people search results page (PSERP) generator, implemented using at least one processor, to:
      generate a people search results page (PSERP), the PRERP comprising references to one or more member profiles representing respective members in an on-line social network system, and
      identify a company keyword as representing the PSERP, the company keyword associated with a company identification representing a company profile maintained in the on-line social networking system;
    an importance score generator, implemented using at least one processor, to determine importance score for the company keyword utilizing data reflecting how frequently people-related search requests include the company keyword and also reflecting a number of member profiles in the on-line social network system that follow the company profile;
    a priority score generator, implemented using at least one processor, to generate a priority score for the company keyword, utilizing the importance score; and
    a web page generator, implemented using at least one processor, to generate a web page including a reference to the PSERP based on the priority score for the company keyword.

12. The system of claim 11, wherein the importance score is generated using a number of employees at an organization identified by the company identification.

13. The system of claim 11, wherein the importance score reflects a financial value associated with an organization identified by the company identification.

14. The system of claim 13, wherein the financial value represents market capitalization for the organization identified by the company identification.

15. The system of claim 13, wherein the financial value represents market capitalization per employee of the organization identified by the company identification.

16. The system of claim 11, wherein the web page is a people directory page provided by the on-line social network system, the system comprising a presentation module, implemented using at least one processor, to cause presentation of the people directory page on a display device.

17. The system of claim 11, wherein the reference to the PSERP is the company keyword.

18. The system of claim 11, wherein the importance score generator is to determine the importance score for a pair comprising the company keyword and a location keyword representing a geographic location.

19. The system of claim 11, wherein the priority score generator is to use, in addition to the importance score, a relevance score generated for the company keyword, the relevance score expressing how likely a search request that includes the company keyword is to produce a relevant result that originates from the on-line social network system, the search request directed to a third party search engine, the third party search engine and the on-line social network system provided by different entities.

20. A machine-readable non-transitory storage medium having instruction data executable by a machine to cause the machine to perform operations comprising:
- generating a people search results page (PSERP), the PRERP comprising references to one or more member profiles representing respective members in an on-line social network system;
- identifying a company keyword as representing the PSERP, the company keyword associated with a company identification representing a company profile maintained in the on-line social networking system;
- determining importance score for the company keyword utilizing data reflecting how frequently people-related search requests include the company keyword and also reflecting a number of member profiles in the on-line social network system that follow the company profile;
- generating a priority score for the company keyword, utilizing the importance score; and
- generating a web page including a reference to the PSERP based on the priority score for the company keyword.

* * * * *